(12) United States Patent
Katsuyama

(10) Patent No.: US 8,988,696 B2
(45) Date of Patent: Mar. 24, 2015

(54) IMAGE FORMING APPARATUS

(71) Applicant: Goro Katsuyama, Kanagawa (JP)

(72) Inventor: Goro Katsuyama, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/260,478

(22) Filed: Apr. 24, 2014

(65) Prior Publication Data

US 2014/0327926 A1 Nov. 6, 2014

(30) Foreign Application Priority Data

May 2, 2013 (JP) .................................. 2013-097109
Mar. 6, 2014 (JP) .................................. 2014-044374

(51) Int. Cl.
*G06F 3/12* (2006.01)
*G06K 15/00* (2006.01)
*H04N 1/00* (2006.01)

(52) U.S. Cl.
CPC ....... *H04N 1/00838* (2013.01); *H04N 1/00278* (2013.01)
USPC ......................................... 358/1.13; 358/1.14

(58) Field of Classification Search
None
See application file for complete search history.

(56) References Cited

U.S. PATENT DOCUMENTS

| 2002/0150403 A1 | 10/2002 | Katsuyama et al. |
| 2002/0195915 A1 | 12/2002 | Katsuyama et al. |
| 2003/0052956 A1 | 3/2003 | Katsuyama |
| 2003/0170041 A1 | 9/2003 | Katsuyama |
| 2004/0114958 A1 | 6/2004 | Katsuyama et al. |
| 2009/0007232 A1* | 1/2009 | Kasatani ........................... 726/2 |
| 2011/0181903 A1 | 7/2011 | Katsuyama et al. |
| 2012/0294645 A1 | 11/2012 | Shimada et al. |

FOREIGN PATENT DOCUMENTS

| JP | 2008277886 A | * | 11/2008 |
| JP | 2011-154075 | | 8/2011 |
| JP | 2013-008011 | | 1/2013 |

* cited by examiner

*Primary Examiner* — Thomas Lett
(74) *Attorney, Agent, or Firm* — Harness, Dickey & Pierce, P.L.C.

(57) ABSTRACT

An image forming apparatus includes a top panel member that is arranged on an operator stand side of a main body of the image forming apparatus, that includes a recess having a bottom surface located below a level of a top surface of the top panel member, and that allows an authentication device configured to read information stored in an information recording medium to be mounted on the bottom surface of the recess; and a detachable cover that includes a protruding part, the protruding part protruding upward and defining, together with the recess, a space for housing the authentication device.

9 Claims, 7 Drawing Sheets

US 8,988,696 B2

IMAGE FORMING APPARATUS

CROSS-REFERENCE TO RELATED APPLICATIONS

The present application claims priority to and incorporates by reference the entire contents of Japanese Patent Application No. 2013-097109 filed in Japan on May 2, 2013 and Japanese Patent Application No. 2014-044374 filed in Japan on Mar. 6, 2014.

BACKGROUND OF THE INVENTION

1. Field of the Invention

The present invention relates to an image forming apparatus, in which an authentication device is additionally mountable on a top panel thereof.

2. Description of the Related Art

In some cases, authentication devices may be mounted on electrophotographic image forming apparatuses, such as copiers, printers, or multifunction peripherals. The authentication devices read information stored in information storage media, such as card recording media, in a non-contact manner to perform user authentication, and are used to manage the number of copies used in copiers or to manage accounting. In general, the authentication devices are not standard equipment of the image forming apparatuses but are additionally mounted as optional extras.

Conventionally, in the image forming apparatuses as described above, the authentication devices are externally mounted on special tables attached to the sides of the image forming apparatuses, or externally mounted in mounting spaces provided in the image forming apparatuses. Furthermore, dedicated authentication devices may be prepared and incorporated in the image forming apparatuses.

Japanese Laid-open Patent Publication No. 2011-154075 discloses a structure in which an authentication device is mounted on a recess that appears when a cover mounted on the exterior of a main body of the apparatus is opened. Specifically, an operating unit of the image forming apparatus described in Japanese Laid-open Patent Publication No. 2011-154075 includes an operation panel and an authentication device mounting part. The authentication device mounting part includes a surface and a cover that are downwardly inclined toward the front side in the same manner as the operation panel. The cover is arranged on the recess used to mount the authentication device, and the authentication device is mounted on the recess.

However, the conventional image forming apparatuses are configured to incorporate dedicated authentication devices formed of only substrates without exterior components, and are not expected to incorporate universal authentication devices that are manufactured by and purchased from other companies and that are connectable via universal serial bus (USB) cables. Therefore, it is necessary to purchase the dedicated authentication devices when authentication devices are to be incorporated.

Furthermore, in the apparatus described in Japanese Laid-open Patent Publication No. 2011-154075, it is still difficult to cope with various authentication devices including authentication devices greater in size than the recess.

Therefore, there is a need for an image forming apparatus capable of easily incorporating a removable authentication device.

SUMMARY OF THE INVENTION

An image forming apparatus includes a top panel member that is arranged on an operator stand side of a main body of the image forming apparatus, that includes a recess having a bottom surface located below a level of a top surface of the top panel member, and that allows an authentication device configured to read information stored in an information recording medium to be mounted on the bottom surface of the recess; and a detachable cover that includes a protruding part, the protruding part protruding upward and defining, together with the recess, a space for housing the authentication device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
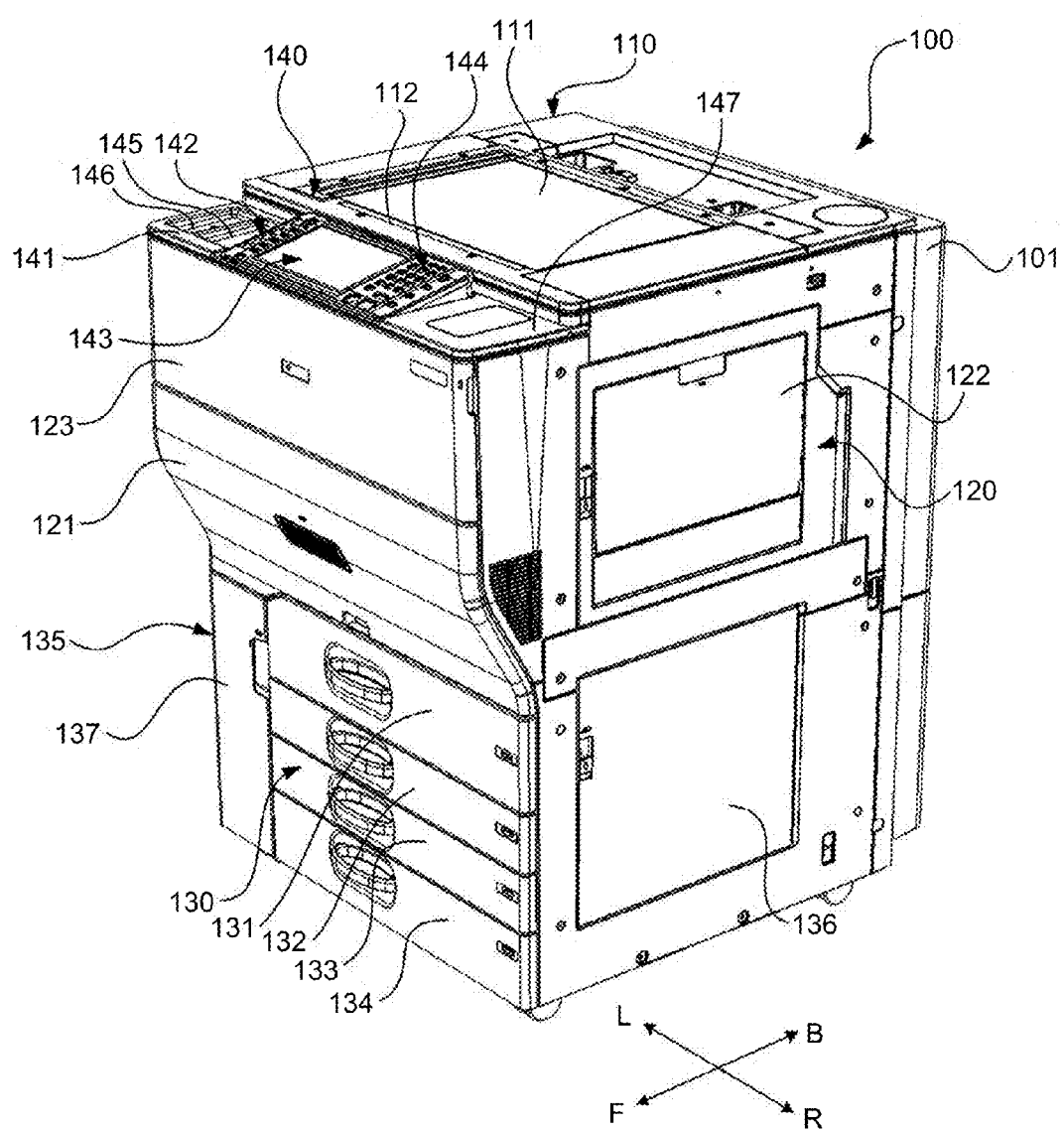
FIG. 1 is a perspective view illustrating an image forming apparatus according to an embodiment of the present invention.

Exemplary embodiments of an image forming apparatus according to the present invention will be explained below. First, an overall structure of the image forming apparatus will be described. FIG. 1 is a perspective view illustrating an image forming apparatus according to an embodiment of the present invention. An image forming apparatus 100 includes, in an apparatus main body 101, a document reading unit 110 that optically reads documents, an image forming unit 120 that forms an image on a recording medium such as a sheet by an electrophotographic method, and a sheet storage unit 130 for storing sheets according to sheet sizes. The image forming apparatus 100 further includes an operating unit 140 that performs operation of the image forming apparatus. The operating unit 140 is arranged on a top surface of the document reading unit 110 of the apparatus main body 101 on an operator stand side (front side), where an operator of the document reading unit 110 stands, along a width direction (left-right direction). In the drawings, the front side is indicated by F, the rear side is indicated by B, the right side is indicated by R, and the left side is indicated by L.

The document reading unit 110 includes a document reader. On the top surface of the document reader, a contact glass 111 as a document reading surface and a frame 112 are arranged. A pressurizing plate for pressing a document against the contact glass ill and an auto document feeder (ADF) (both of which are not illustrated) are arranged above the document reading unit 110.

The image forming unit 120 houses an image forming unit that forms a full-color toner image by using toners of four colors of yellow, magenta, cyan, and black, and a fixing device that fixes the toner image to a sheet. The sheet storage unit 130 includes four sheet feed trays 131, 132, 133, and 134 according to sheet sizes for example. Each of the sheet feed trays 131, 132, 133, and 134 stores a bundle of sheets in a corresponding sheet size.

The image forming apparatus 100 includes a sheet conveying device (not illustrated). The sheets stored in the sheet feed trays 131, 132, 133, and 134 of the sheet storage unit 130 are conveyed one by one by the sheet conveying device to the image forming unit 120, subjected to a toner image formation process, a fixing process, or the like, and discharged to a discharge tray (not illustrated). Furthermore, the sheet conveying device includes a reversing device that reverse a sheet to perform duplex printing. The reversing device conveys a sheet to a purging unit 135 adjacent to the sheet storage unit 130, and reverses the sheet by changing a sheet conveying direction.

The image forming apparatus 100 further includes a plurality of doors to remove, from the apparatus, a sheet jammed in the apparatus. Specifically, the image forming unit 120 includes a secondary-transfer-unit drawer 121 and a manual feed door 122, the sheet storage unit 130 includes a sheet-storage-unit door 136, and the purging unit 135 of the reversing device includes a purging-unit door 137. Furthermore, a toner replacement door 123 is provided on top of the secondary-transfer-unit drawer 121.

The operating unit 140 includes an operation panel 142 in the center of a top panel member 141 serving as an exterior member of the image forming apparatus 100 in the width direction. The operation panel 142 includes a touch panel 143 and an operation button 144 including a numerical keypad, a start key button, and the like. These parts are arranged so as to be downwardly inclined toward the front side by taking into account the operability. Furthermore, in the top panel member 141, recesses 145 and 146 for placing clips or the like attached to documents are formed on the left side of the operation panel 142. Moreover, a horizontal flat part 147, as a top surface serving as a flat surface where an authentication device is mountable, is formed on the right side of the operation panel 142. On the horizontal flat part 147, a removable authentication device 200, which reads information stored in an information recording medium such as an integrated circuit (IC) card in a non-contact manner, is mountable.

Figure 2A:
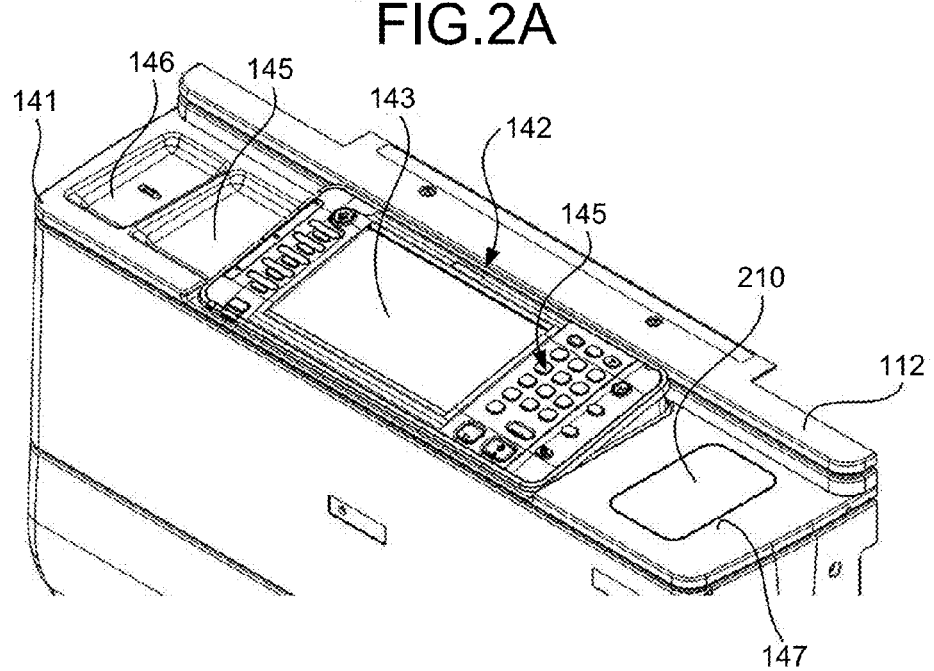
FIG. 2A is a perspective view illustrating an operation panel of an operating unit when an authentication device is not mounted on the image forming apparatus according to the embodiment.
Figure 2B:
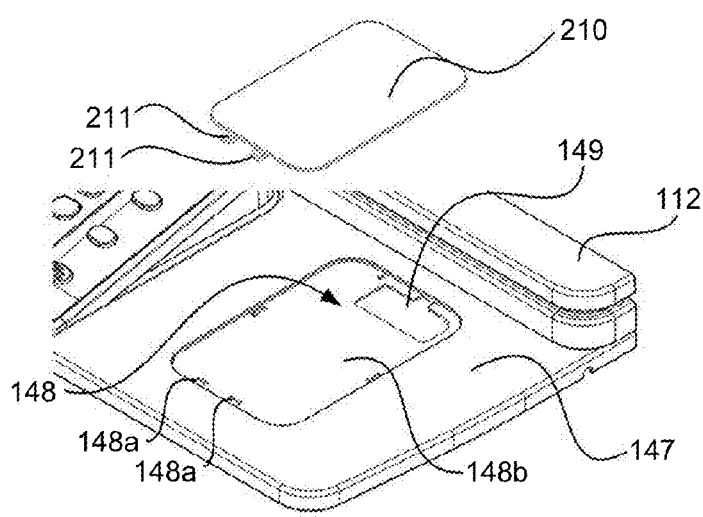
FIG. 2B is an exploded perspective view of a mounting part of the authentication device.
Figure 2C:
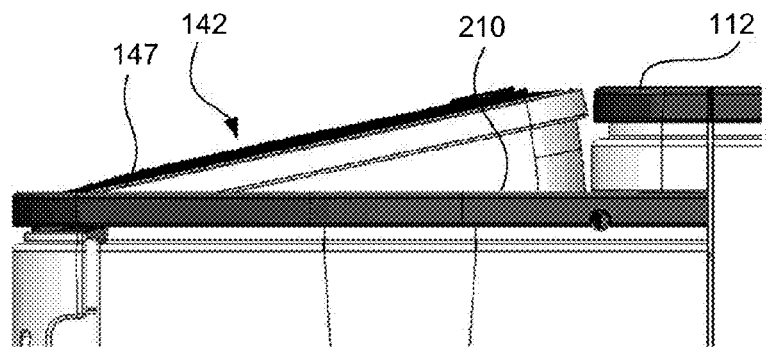
FIG. 2C is a side view illustrating the operation panel.
Figure 3A:
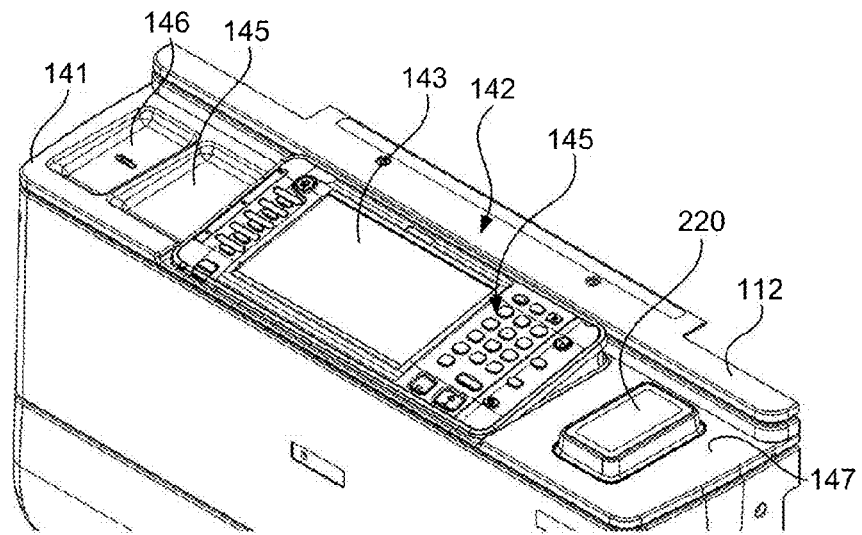
FIG. 3A is a perspective view illustrating the operation panel of the operating unit when the authentication device is mounted on the image forming apparatus according to the embodiment.
Figure 3B:
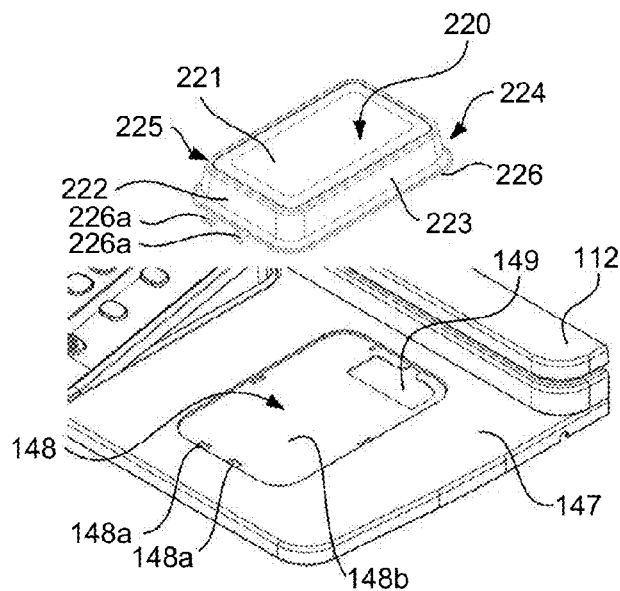
FIG. 3B is an exploded perspective view illustrating the mounting part of the authentication device.
Figure 3C:
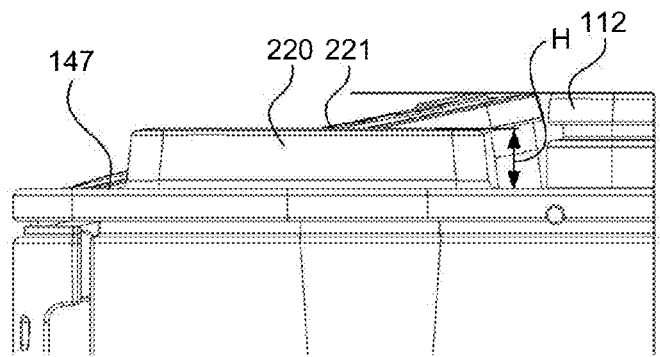
FIG. 3C is a side view illustrating the operation panel.
Figure 4A:
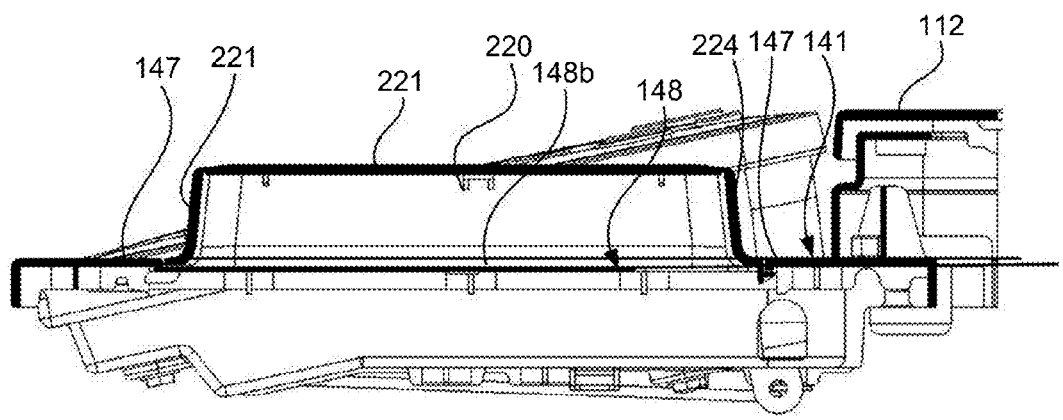
FIG. 4A is a cross-sectional view illustrating a dimensional relationship of an exterior member of the image forming apparatus according to the embodiment.
Figure 4B:
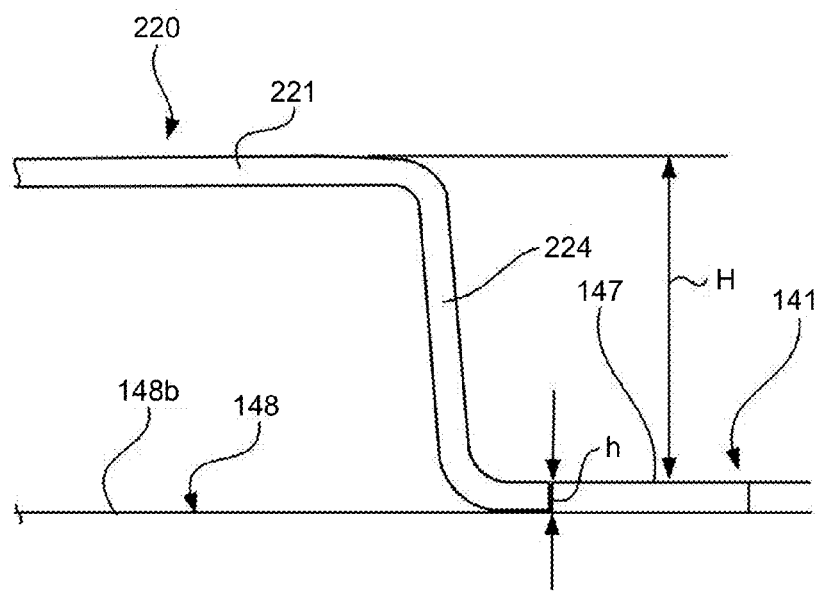
FIG. 4B is an enlarged cross-sectional view illustrating the dimensional relationship of the exterior member of the image forming apparatus according to the embodiment.

FIG. 2A is a perspective view illustrating the operation panel of the operating unit when the authentication device is not mounted on the image forming apparatus according to the embodiment, FIG. 2B is an exploded perspective view of a mounting part of the authentication device, and FIG. 2C is a side view illustrating the operation panel. FIG. 3A is a perspective view illustrating the operation panel of the operating unit when the authentication device is mounted on the image forming apparatus according to the embodiment, FIG. 3B is an exploded perspective view illustrating the mounting part of the authentication device, and FIG. 3C is a side view illustrating the operation panel. FIGS. 4A and 4B are a cross-sectional view and an enlarged cross-sectional view illustrating a dimensional relationship of an exterior member of the image forming apparatus according to the embodiment, respectively.

On the horizontal flat part 147, as illustrated in FIG. 2B and FIG. 3B, a recess 148 to mount the authentication device 200 is formed. The planer shape of the recess 148 is determined by taking into account the size of the authentication device 200 expected to be mounted. The recess 148 includes a bottom surface 148b located below the level of the horizontal flat part 147 serving as the top surface of the top panel member 141. Furthermore, the bottom surface 148b includes mounting holes 148a formed thereon for mounting a plate member 210 and a cover 220, which will be described later. Moreover, the bottom surface 148b includes a cable hole 149 formed thereon. A cable 202 of the authentication device 200, which will be described later, is inserted through the cable hole 149.

When the image forming apparatus 100 is used without mounting the authentication device 200, the plate member 210 is attached to the recess 148 as illustrated in FIGS. 2A to 2C. Therefore, a depth dimension h of the recess 148 (see FIG. 4B) is determined by taking into account at least the thickness of the plate member 210 and by taking further into account that the positioning of the authentication device 200 is made possible. However, because toner containers are arranged below the top panel member 141, it is desirable to reduce the depth dimension as much as possible to prevent reduction in the capacity of a toner container storage space.

As illustrated in FIG. 2B, the plate member 210 has a plate shape whose outline is formed so that the plate member can be fitted to the recess 148 when it is attached to the recess 148, and forms the top surface continuing to the horizontal flat part when it is fitted to the recess 148. Furthermore, the plate member 210 includes claws 211, and the claws 211 are hooked on the mounting holes 148a formed on the recess 148 for attachment and detachment. By attaching the plate member 210 to the recess 148, the mounting holes 148a and the cable hole 149 are covered, so that good appearance of the image forming apparatus 100 is obtained.

In contrast, when the authentication device 200 is mounted on the image forming apparatus 100, as illustrated in FIGS. 3A to 3C, FIGS. 5A and 5B, and FIGS. 6A to 6C, the authentication device 200 is mounted on the bottom surface 148b of the recess 148 formed on the horizontal flat part 147 and the upper side of the authentication device 200 is covered by the cover 220. Therefore, the authentication device 200 is housed in an inner space defined by the recess 148 and the cover 220. When the authentication device 200 is to be mounted on the recess 148, the cable 202 of the authentication device 200 is inserted through the cable hole 149 and electrically connected inside the apparatus. Therefore, not only the authentication device 200 but also the cable 202 are not exposed on the outer surface of the image forming apparatus, so that good appearance is maintained.

The cover 220 includes a top surface 221, four side surfaces 222, 223, 224, and 225 extending downward from the four sides of the top surface 221, and a flange 226 formed on bottom edges of the side surfaces 222, 223, 224, and 225. With the side surfaces 222, 223, 224, 225 and the top surface 221, the cover 220 forms a protruding part that protrudes upward on top of the horizontal flat part 147.

As illustrated in FIG. 3B, the outline of the flange 226 of the cover 220 is formed so that the flange can be fitted to the recess 148. Furthermore, on the flange 226 of the cover 220, claws 226a to be hooked on the mounting holes 148a on the bottom surface of the recess 148 are provided. The authentication device 200 is placed on the recess 148 and is covered by the cover 220, so that the authentication device 200 is housed in the space defined by the recess 148 and the cover 220. By providing the cover 220, the presence of the authentication device can easily be recognized, so that it becomes possible to visually confirm the presence and the position of the authentication device even in a place distant from the apparatus. Furthermore, because the authentication device 200 is covered by the cover 220, it becomes possible to prevent the authentication device 200 from being stolen.

The cover 220 is structured such that, as illustrated in FIG. 3C, a dimension H (see FIG. 4B) from the horizontal flat part 147 to the top surface 221 is set so that the top surface 221 is not higher than the level of the frame 112 of the document reader of the document reading unit 110 when the cover 220 is attached to the recess 148. Therefore, when a large-sized document, such as a newspaper, is to be read, a portion of the document protruding on the front side may not be disturbed. Furthermore, it is desirable to set the dimension H from the horizontal flat part 147 to the top surface 221 such that, by taking into account a situation where an information recording medium, such as an IC card, being held by fingers is brought into contact with or held over the top surface 221 of the cover 220, the fingers (for example, a thumb and a forefinger) holding the card do not come in contact with the horizontal flat part 147.

Moreover, as illustrated in FIG. 4B, the dimension H from the horizontal flat part 147 to the top surface 221 of the cover 220 is set to be larger than the dimension h from the top surface of the horizontal flat part 147 of the top panel member 141 to the bottom surface of the recess 148. By increasing the amount of protrusion of the cover 220 as described above, it becomes possible to ensure a space for housing the authentication device 200 and easily house a thick authentication device. Furthermore, it becomes possible to easily recognize that the authentication device 200 is arranged. Moreover, by decreasing the depth dimension h of the recess 148, it becomes possible to prevent the toner container arrangement space below (on the back side) the top panel member 141 from being sacrificed.

Figure 5A:
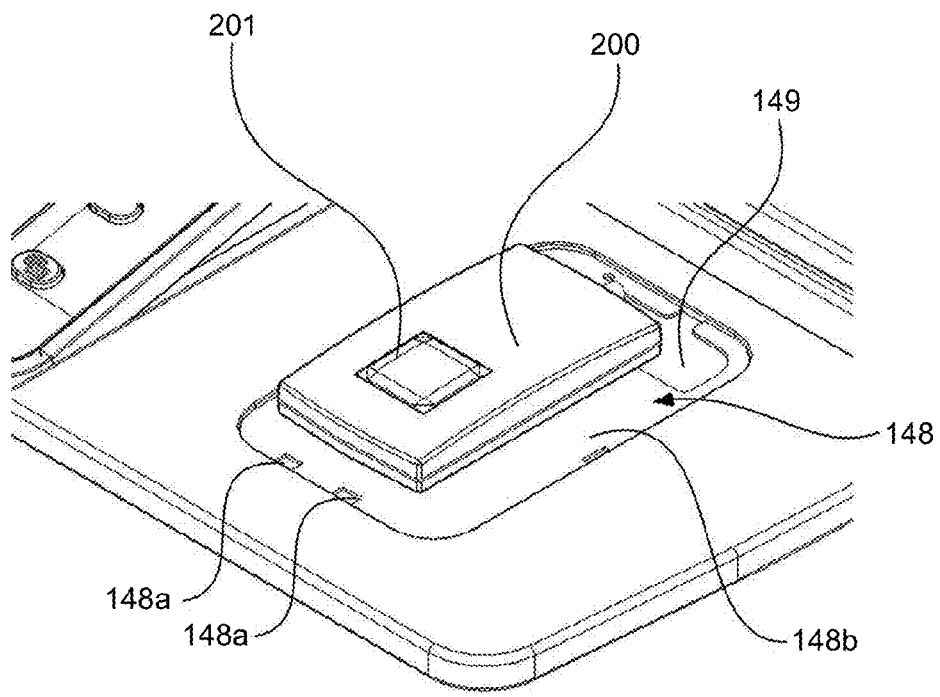
FIG. 5A is a perspective view illustrating a state in which a thick authentication device is mounted on the image forming apparatus according to the embodiment.
Figure 5B:
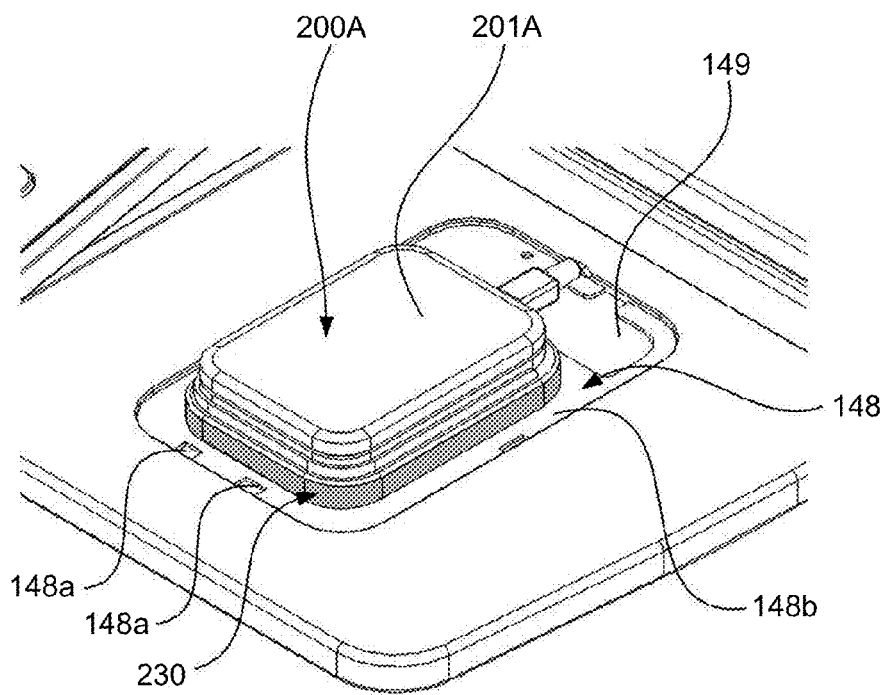
FIG. 5B is a perspective view illustrating a state in which a thin authentication device is mounted on the image forming apparatus according to the embodiment.

FIG. 5A is a perspective view illustrating a state in which a thick authentication device is mounted on the image forming apparatus according to the embodiment, and FIG. 5B is a perspective view illustrating a state in which a thin authentication device is mounted on the image forming apparatus according to the embodiment. When a relatively thick authentication device 200 as illustrated in FIG. 5A is mounted as the authentication device 200, it is possible to place a reading unit 201 of the authentication device 200 close to the top surface 221 of the cover 220, so that a read failure is less likely to occur. In contrast, as illustrated in FIG. 5B, if a thin authentication device 200A is mounted, there is a large interval between a reading surface 201A and the top surface 221 of the cover 220 and a read distance of the authentication device increases, so that it becomes difficult to read information from an information recording medium being held over the top surface. To cope with this, when the thin authentication device 200A is mounted, a height adjustment member 230 is placed between the authentication device 200A and the recess 148. The height adjustment member 230 adjusts the height of the authentication device 200 inside the cover 220 to bring a reading unit of the authentication device 200A close to the top surface 221 of the cover 220. Incidentally, the thickness dimension of the authentication device 200 illustrated in FIG. 5A is about twice the thickness of the thin authentication device 200A illustrated in FIG. 5B.

Figure 6A:
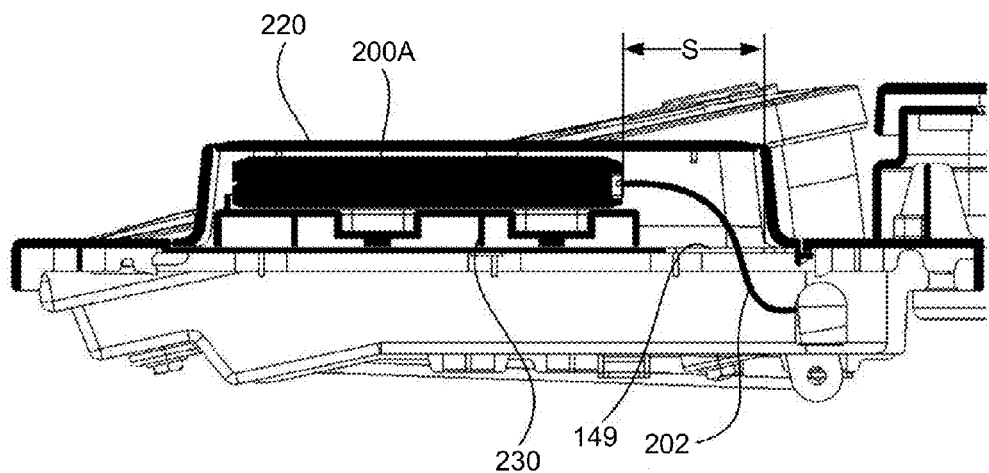
FIG. 6A is a cross-sectional view illustrating an arrangement state in which the thin authentication device is mounted on the image forming apparatus according to the embodiment.
Figure 6B:
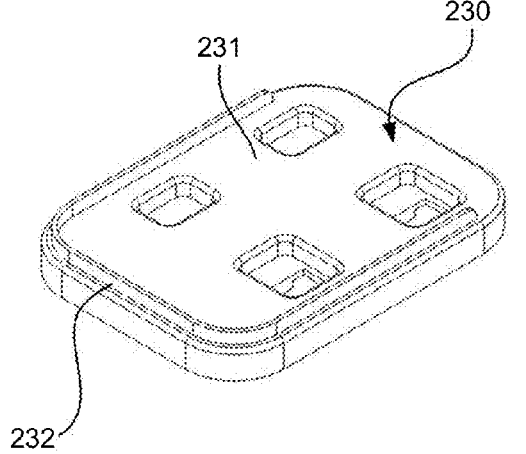
FIG. 6B is a perspective view illustrating a height adjustment member.
Figure 6C:
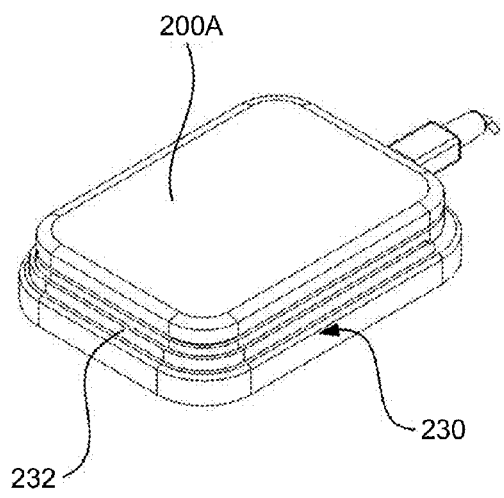
FIG. 6C is perspective view illustrating a state in which the authentication device is placed on the height adjustment member.

FIG. 6A is a cross-sectional view illustrating an arrangement state in which the thin authentication device is mounted on the image forming apparatus according to the embodiment, FIG. 6B is a perspective view illustrating the height adjustment member, and FIG. 6C is perspective view illustrating a state in which the authentication device is placed on the height adjustment member. The height adjustment member 230 is formed by, for example, integral molding with synthetic resin. The height adjustment member 230 includes, as illustrated in FIG. 6B, a protrusion 232 that is formed on the periphery of a top surface 231 and that comes in contact with the periphery of the authentication device 200A. With this, the authentication device 200A can be mounted stably. The height adjustment member may be formed, to adjust the height, by stacking a predetermined number of thin plates to enable adjustment of the thickness, instead of by integral molding. With this configuration, it becomes possible to set a uniform read distance for authentication devices with different thicknesses, enabling to prevent a read failure.

Meanwhile, the cable 202 of the authentication device 200A is "resilient", so that when the cable is attached to the insertion hole by being folded, the cable acts so as to push the authentication device forward and may cause the authentication device 200A to be displaced. The protrusion 232 restricts movement of the authentication device 200A due to the cable 202 and fixes the position of the authentication device 200A on the height adjustment member 230. Furthermore, claws (not illustrated) are formed on the bottom surface of the height adjustment member 230 for positioning with respect to the recess 148, and the claws are attached to openings (not illustrated) formed on the bottom surface 148b of the recess 148. Moreover, the dimension of the cover 220 in the front-rear direction (left-right direction in FIG. 6A) is determined such that a cable arrangement space (indicated by an arrow S in FIG. 6A) is ensured when the authentication device 200A is mounted by taking into account that the cable 202 is arranged from the rear side of the authentication device 200A to the cable hole 149.

Furthermore, the height adjustment member 230 may be made of a material that blocks electromagnetic waves. Alternatively, a blocking member, such as ferrite, that blocks electromagnetic waves may be arranged below the height adjustment member 230. With this configuration, it becomes possible to reduce the influence of electromagnetic waves from metals, such as sheet metals, below the recess 148, enabling to prevent the influence on reading by the authentication device. If a member that blocks electromagnetic waves is placed below the authentication device 200 with a normal thickness, it becomes possible to reduce the influence of the electromagnetic waves.

Figure 7A:
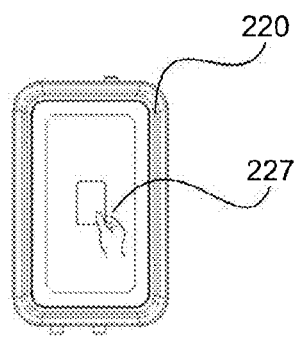
FIG. 7A is a plan view illustrating a mark written on a cover of the image forming apparatus according to the embodiment, when the cover is arranged in a vertical manner.
Figure 7C:
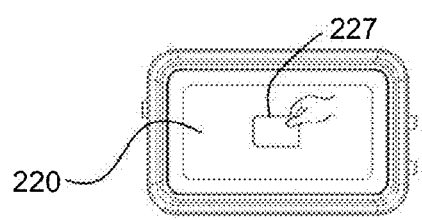
FIG. 7C is a plan view illustrating the mark written on the cover of the image forming apparatus according to the embodiment, when the cover is arranged in a horizontal manner.
Figure 7B:
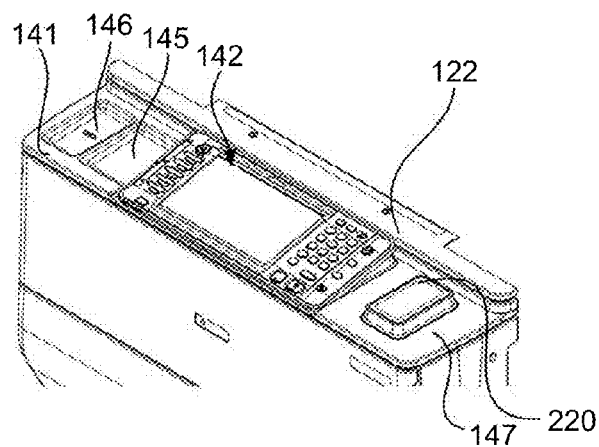
FIG. 7B is a perspective view illustrating a state in which the cover is arranged on the operating unit in a vertical manner.
Figure 7D:
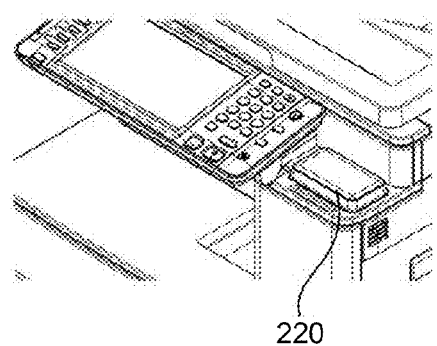
FIG. 7D is a perspective view illustrating a state in which the cover is arranged on the operating unit in a horizontal manner.

Moreover, on the top side of the top surface 221 of the cover 220, a mark 227 may be displayed to indicate a portion where an information recording medium, such as an IC card, is to be brought into contact with or close to for data reading. FIG. 7A is a plan view illustrating the mark written on the cover of the image forming apparatus according to the embodiment, when the cover is arranged in a vertical manner, FIG. 7B is a perspective view illustrating a state in which the cover is arranged on the operating unit in a vertical manner, FIG. 7C is a plan view illustrating the mark written on the cover of the image forming apparatus according to the embodiment, when the cover is arranged in a horizontal manner, and FIG. 7D is a perspective view illustrating a state in which the cover is arranged on the operating unit in a horizontal manner. As the mark 227, characters, pictograms, symbols, or the like may be used. The mark is formed so that it can be recognized in both of the vertical and the horizontal directions by taking into account that the cover 220 may be arranged in any of the vertical direction (FIGS. 7A and 7B) and the horizontal direction (FIGS. 7C and 7D). The mark 227 may be displayed on the top surface 221 by printing, engraving, decal transfer, or the like. With this configuration, it becomes possible to use the cover 220 as a common component regardless of the direction of the authentication device, enabling to reduce costs for components.

Furthermore, the top surface 221 of the cover 220 may be made of a material that enables luminescence display of the authentication device in the cover to be recognized. For example, if a pilot lamp is turned on in the authentication device 200, it becomes possible to recognize the pilot lamp of the authentication device 200 through the top surface 221 of the cover 220 to confirm the operating state of the authentication device 200.

For this purpose, the cover 220 may be made of a transparent or semitransparent material that enables the inside to be viewed. Furthermore, only the top surface of the cover 220 may be made of a transparent or semitransparent material that enables the inside to be viewed. Moreover, it may be possible to form an opening in a position on the top surface 221 of the cover 220 in accordance with the position of the pilot lamp of the authentication device 200.

In the embodiment as described above, the image forming apparatus 100 including the document reading unit 110 on the image forming unit 120 is described. However, the image forming apparatus 100 is not limited to the above embodiment. For example, an in-body sheet discharge space where a sheet carrying a formed image is discharged may be formed between the document reading unit 110 and the image forming unit 120. Furthermore, while an example is explained in which the top panel member 141 is integrated with the exterior member that houses the image forming unit 120, only the operation panel 142 may be mounted on the exterior member. Moreover, the information recording medium to be read by the authentication device 200 may be other information storage medium that transmits signals by radio communications, instead of the IC card. Examples of such an information storage medium include a smartphone, a mobile phone terminal, and a digital camera with a communication function.

According to an embodiment of the present invention, it becomes possible to easily incorporate a removable authentication device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a top panel member that is arranged on an operator stand side of a main body of the image forming apparatus, that includes a recess having a bottom surface located below a level of a top surface of the top panel member, and that allows an authentication device configured to read information stored in an information recording medium to be mounted on the bottom surface of the recess; and
a detachable cover that includes a protruding part, the protruding part protruding upward and defining, together with the recess, a space for housing the authentication device.

2. The image forming apparatus according to claim 1, wherein a distance from the top surface of the top panel member to a top surface of the cover is larger than a distance from the top surface of the top panel member to the bottom surface of the recess.

3. The image forming apparatus according to claim 1, wherein the bottom surface of the recess includes a hole through which a cable connected to the authentication device is insertable.

4. The image forming apparatus according to claim 1, further comprising a document reader to read a document, wherein
the top surface of the cover is located below a level of a document reading surface of the document reader.

5. The image forming apparatus according to claim 1, further comprising a height adjustment member that is arranged between the authentication device and the bottom surface of the recess and that adjusts a height position of the authentication device inside the cover.

6. The image forming apparatus according to claim 1, further comprising a mark that is provided on the top surface of the cover to indicate a portion where the information recording medium is to be brought into contact with or close to, and that is recognizable even when the cover is arranged in any of a vertical direction and a horizontal direction.

7. The image forming apparatus according to claim 1, wherein the top surface of the cover is made of a material that enables luminescence display of the authentication device mounted in the cover to be recognized.

8. The image forming apparatus according to claim 1, wherein the recess is formed on a horizontal flat surface of the top panel member.

9. The image forming apparatus according to claim 1, further comprising a blocking member that is arranged between the authentication device and the bottom surface of the recess to block electromagnetic waves.

* * * * *